(12) United States Patent
Andersen et al.

(10) Patent No.: US 6,607,066 B1
(45) Date of Patent: Aug. 19, 2003

(54) CONVEYOR

(75) Inventors: Per Andersen, Mundelstrup (DK); Steen Kibsgaard, Hadsetn (DK); Hans Stensgard-Bay, Abyhoj (DK); Flemming Frederiksen, Arhus V (DK)

(73) Assignee: Crisplant A/S, Arhus N (DK)

( * ) Notice: Subject to any disclaimer, the term of this patent is extended or adjusted under 35 U.S.C. 154(b) by 0 days.

(21) Appl. No.: 09/743,420

(22) PCT Filed: Jun. 17, 1999

(86) PCT No.: PCT/DK99/00332
§ 371 (c)(1),
(2), (4) Date: Apr. 20, 2001

(87) PCT Pub. No.: WO00/02802
PCT Pub. Date: Jan. 20, 2000

(30) Foreign Application Priority Data

Jul. 10, 1998 (DK) .......................................... 1998 00928

(51) Int. Cl.[7] .............................................. B65G 47/10
(52) U.S. Cl. ............................................... 198/370.04
(58) Field of Search ....................... 198/370.04, 803.14

(56) References Cited

U.S. PATENT DOCUMENTS

| | | | |
|---|---|---|---|
| 5,018,928 A | * | 5/1991 | Hartlepp ................. 198/370.04 |
| 5,353,912 A | | 10/1994 | Killer et al. |
| 5,642,802 A | | 7/1997 | Maier et al. |
| 5,664,660 A | * | 9/1997 | Prydtz et al. .......... 198/370.04 |
| 5,667,054 A | * | 9/1997 | van den Goor ........ 198/370.04 |
| 6,135,262 A | * | 10/2000 | Polling ................... 198/370.04 |
| 6,152,280 A | * | 11/2000 | Bruun .................... 198/370.04 |

FOREIGN PATENT DOCUMENTS

| | | |
|---|---|---|
| EP | A540464 | 5/1993 |
| EP | A782966 | 7/1997 |
| WO | A9713712 | 4/1997 |
| WO | A9847797 | 10/1998 |

* cited by examiner

*Primary Examiner*—Joseph E. Valenza
(74) *Attorney, Agent, or Firm*—Birch, Stewart, Kolasch & Birch, LLP

(57) ABSTRACT

A conveyor for transporting articles of mixed sizes, such as luggage and/or mail has a plurality of interconnected conveyor units, each comprising an article supporting member, such as a tray or a conveyor belt or any other suitable supporting member. The article supporting members of the conveyor units may be used individually for transporting articles, and two or more consecutive conveyor units may in an aligned state to form a common article support surface for transporting articles larger than the individual article supporting member.

15 Claims, 15 Drawing Sheets

CONVEYOR

This application is the national phase under 35 U.S.C. § 371 of PCT International Application No. PCT/DK99/00332 which has an International filing date of Jun. 17, 1999, which designated the United States of America.

The present invention relates to a conveyor for transporting articles of mixed sizes, such as luggage and/or mail. More particularly the invention relates to a conveyor comprising a plurality of interconnected conveyor units, each comprising an article supporting member, such as a tray or a conveyor belt or any other suitable supporting member. The article supporting members of the conveyor units may be used individually for transporting articles, and two or more consecutive conveyor units may in an aligned state form a common article support surface for transporting articles larger than the individual article supporting member.

The present invention further relates to a pair of conveyor units for use in the conveyor.

BACKGROUND

Conveyors comprising a plurality of interconnected conveyor units, each comprising an article supporting member are generally known. It is further known to allow articles being conveyed by such conveyors to be carried by supporting members belonging to two or more adjacent conveyor units. However, articles carried by supporting members belonging to two or more adjacent conveyor units tend to shift on the surfaces of the supporting members when the conveyor units enter curves in a horizontal plane along the guide track, since a conveyor unit positioned in front of another conveyor unit will enter the curve before the other conveyor unit, resulting in mutual dispositioning of supporting members supporting the same article. The position of the article may shift so much that the performance and/or operation of the conveyor is disturbed. In some cases, the article may shift so much that it leaves one or more of the supporting members supporting the article, and it may even leave all of the supporting members supporting the article. This is in particular a problem if the conveyor units have to enter many curves while conveying the article. This may occur, e.g., when the guide track is very long and/or if the article has to be conveyed along the guide track several times, e.g. when a barcode, e.g. containing information about the destination of the article, needs to be read and the barcode is not very clear, e.g. due to damage and/or due to the barcode being positioned between the article and the surface of the supporting member, for which reason several passages of the barcode reader is required, thus the article has to travel the entire path of the guide track several times.

European patent No. EP 0 540 464 B1 discloses a conveyor comprising a plurality of trucks coupled together to form an endless chain of trucks, each truck having two dishes which are arranged one behind the other in the direction of travel, the two dishes forming a substantially continuous common supporting surface. The two dishes are capable of pivoting individually so as to unload goods being conveyed by the truck. It is thus possible to tip both, only one or none of the dishes at a certain destination station.

When large articles need to be conveyed by a conveyor as described above, the trucks need to be sufficiently long that the articles may be accommodated by the two dishes of a truck. This puts a lower limit to the radius of curvature of the curves of the guide track which may cause the area requirements of the conveyor to increase.

It is an object of the present invention to provide a conveyor for transporting articles of mixed sizes, the conveyor comprising a plurality of article supporting members, each member individually being able to support articles and at least some of the members being able to form a common article supporting surface for larger articles together with one and optionally more than one adjacent members, the members forming a common article supporting surface being substantially aligned in a projection on a horizontal plane so as to prevent articles from shifting their position when the members move at a path that curves in the horizontal plane and the members being supported by individual conveyor units that are mutually pivotally connected so as to allow the interconnected conveyor units to pass curves having a small radius of curvature, thereby reducing the area requirements of the conveyor.

It is a further object of the invention to provide a conveyor wherein the article supporting members forming a common article supporting surface are substantially aligned during all mutual pivotally movements of the conveyor units.

It is a still further object of the invention to provide a conveyor wherein the article supporting members may be shifted between an aligned and a non-aligned state with an adjacent member.

It is a yet still further object of the invention to provide a conveyor wherein a plurality of the article supporting members may be shifted between an aligned and a non-aligned state with both its immediately adjacent article supporting members so as to increase the flexibility of the conveyor regarding transport of large and small articles.

It is a yet still further object of the invention to provide a conveyor wherein more than two consecutive article supporting members may be aligned so as to make the conveyor more flexible regarding variations of the size of the articles that are conveyed.

DESCRIPTION OF THE INVENTION

The present invention provides a conveyor for transporting articles, the conveyor comprising
- a stationary guide track having curved track sections,
- at least one loading station for loading articles onto article supporting surfaces of the conveyor,
- at least one discharge station for receiving articles from article supporting surfaces of the conveyor, and
- a plurality of interconnected conveyor units which are mutually pivotally coupled, each conveyor unit comprising
  - a frame part,
  - an article supporting member mounted on and supported vertically by the frame part, the article supporting member having an article supporting surface, and
  - means for discharging articles from said article supporting member at a predetermined discharge station, at least one of the plurality of conveyor units belonging to a first group of conveyor units, each of the conveyor units belonging to the first group of conveyor units comprising
  first means for aligning the conveyor unit with another immediately adjacent conveyor unit belonging to a second group of conveyor units,
each of the conveyor units belonging to the second group of conveyor units comprising
  second means for aligning the conveyor unit with another immediately adjacent conveyor unit belonging to the first group of conveyor units,
said first aligning means and said second aligning means being designed so that when a first conveyor unit belonging to the first group of conveyor units and an adjacent second conveyor unit belonging to the second group of conveyor units are aligned with each other by their respective first aligning means and second aligning means, the article supporting member of the first conveyor unit and the article supporting member of the second conveyor unit are substantially aligned in a projection on a horizontal plane so as to form a substantially common article supporting surface during all mutual pivotally movements of said first conveyor unit and said second conveyor unit.

The stationary guide track may be, e.g., a pair of mutually spaced rails adapted for receiving pairs of wheels which may be positioned on the individual conveyor units. It may alternatively be, e.g., a monorail or any other suitable kind of track. The stationary guide track defines the path of the conveyor. It is preferably a closed track, but it may alternatively be open-ended and establishing a conveyor connection between a loading station which is positioned at one end of the guide track and a discharge station which is positioned at the other end of the guide track.

The stationary guide track may comprise curved track sections being curved in a substantially horizontal plane and/or it may comprise curved track sections being curved in a substantially vertical plane. It may alternatively or additionally comprise curved track sections being curved in a plane having a normal vector having a horizontal as well as a vertical component.

The conveyor units may be, e.g., wagons or carts, and each of them may comprise wheels or other suitable means for engaging with the stationary guide track, so that the conveyor units are guided along the guide track. The conveyor units are interconnected, preferably one behind the other so as to form a chain of conveyor units, most preferably forming a closed loop of conveyor units.

The article supporting members may comprise trays or other suitable means being tiltably mounted on the respective frame parts, in which case the article supporting surface of each supporting member is an upper surface of the tray, and in which case the discharging means are means for tilting the tray. The tilting means may comprise, e.g., one or more tilting tracks positioned along the stationary guide track near at least one of the at least one discharge stations, and one or more tilting wheels positioned on the conveyor unit and adapted for engaging with the tilting track, the tilting track(s) and the tilting wheel(s) being positioned in such a way that a tilting wheel may be made to engage with a tilting track when desired, and in such a way that the tray is tilted when one or more tilting wheels engages with one or more tilting tracks. Thus, a tray may be tilted when desired.

The tilt trays may be fitted with a lip extending upwards from at least a part of the edges of the tray so as to prevent or impede the article from sliding off the tray during operation of the conveyor. These lips are preferably present at the ends in a conveying direction of trays that are not to be aligned with the adjacent tray in that direction, so as to prevent the articles from sliding over to the adjacent tray or into the gap between the adjacent trays.

The article supporting members may alternatively or additionally comprise conveyor belts having a conveying directions which is substantially perpendicular to the direction of transportation of the conveyor, in which case the article supporting surface of each supporting member is an upper surface of the conveyor belt, and in which case the discharging means are means for activating the conveyor belt, thereby applying a velocity to the belt in a direction which is substantially perpendicular to the direction of transportation of the conveyor to the article being conveyed. The belt may thus be activated when a certain conveyor unit is passing a certain discharge station, thereby discharging the article being conveyed by the certain conveyor unit at the certain discharge station.

In order to prevent articles or parts of articles, such as straps or flaps, from extending below the articles supporting surface of the article supporting members and thereby possibly causing a stop of the operation of the conveyor and even severe damage to the conveyor, it has been found to be advantageous that one of the article supporting members of two immediately adjacent conveyor units comprises covering means for covering a possible gab between the article supporting members of the two conveyor units, the covering means engages with the other of the two conveyor units so as to cover the gap during mutual pivotally movements of the two conveyor units.

The covering means may be arranged to cover gaps between the article supporting members of all immediately adjacent conveyor units of the conveyor are covered with covering means during mutual pivotally movements of the adjacent conveyor units or only to cover possible gaps between conveyor units that are or may be aligned with each other.

In a more preferred embodiment of the present invention comprise both of the article supporting members of two immediately adjacent conveyor units covering means for covering a possible gab between the article supporting members of the two conveyor units, the covering means engage mutually so as to cover the gap during mutual pivotally movements of the two conveyor units.

At least one of the covering means may comprises a slidable sheet member extending from the article supporting member of the respective conveyor unit in the direction towards the article supporting member of the other adjacent conveyor unit, the slidable sheet member being mounted slidably substantially in a conveying direction of the conveyer and being resiliently biased towards and engaging with said adjacent conveyor unit.

Additionally or alternatively may at least one of the covering means comprises a pivotally sheet member extending from the article supporting member of the respective conveyor unit in the direction towards the article supporting member of the other adjacent conveyor unit, the pivotally sheet member being mounted pivotally about an axis being substantially perpendicular to the article supporting surface. The pivotally sheet member may thus compensate for mutual pivotal movements in the plane of the article supporting surfaces.

The previously mentioned first conveyor unit and second conveyor unit may preferably constitute the two adjacent conveyor units.

In order to prevent or impede parts of articles being conveyed by the conveyor from being wedged during mutual tilting movements of the article supporting members of the conveyor units, the covering means are preferably at their engaging ends, respectively the covering mean and the conveyor units engaging ends, equipped with screen parts extending downwards from said ends and transversely to the conveying direction of the conveyer in the conveying direction of the conveyer.

The engaging ends of the covering means, respectively the engaging ends of the covering mean and the conveyor units, may be subjected to friction during possible tilting of the article supporting members and due to possible mutual displacement transversely to the conveying direction of the conveyor in which cases the mutually engaging surface parts of the conveyor units and/or the covering means may be coated with a friction reducing and/or wear resistant material.

The first and second aligning means may establish a physical connection between the two conveyor units. They may thus comprise, e.g., a rigid rod which is permanently connected to one of the conveyor units or both of the conveyor units.

Alternatively or additionally, the first and second aligning means may comprise, e.g., magnetic and/or electrical means, so that a magnetic and/or electrical connection may be established between the two conveyor units.

The first and second aligning means do not have to form a physical connection between the two conveyor units. Instead the aligning means may have independent drive means such as an electrical motor, the drive means and thereby the alignment being controlled by control means that is either present on the conveyor unit or is in data communication contact with a control unit on a stationary part of the conveyor. In another embodiment according to the present invention, one or both of the two conveyor units may comprise a guiding arm following a track constituting a part of the guide track, the guiding arm being connected to the article supporting member in such a way that the desired aligning of the article supporting members are obtained. In case the conveyor units comprises a power source, as e.g. cross-belt conveyors usually do, the guide arm may comprise a sensor that provides an output from which a control unit may control an electric motor adjusting the position of the article supporting member accordingly.

The first and second aligning means comprise in an alternative embodiment optical detection means for detecting the position of the article supporting member of an adjacent conveyor unit and/or a detectable object indicating said position. The optical detection means are adapted for providing an output from which a control unit may control an electric motor adjusting the position of the article supporting member accordingly.

When a first and a second conveyor unit are aligned with each other, their article supporting surfaces will be aligned in such a way that when the article supporting surfaces are projected onto a substantially horizontal plane they are substantially aligned in that plane during all mutual pivotally movements of the conveyor units, regardless of whether the mutual pivotally movements take place in a substantially horizontal plane, a substantially vertical plane or in a plane having a normal vector having a horizontal as well as a vertical component. Thus, there are no or very little mutual movements of the projections of the two article supporting surfaces on the horizontal plane, whereby a substantially common article supporting surface is formed by the two article supporting surfaces of the conveyor units.

The conveyor further comprises control means for controlling the operation of the conveyor, including loading of articles onto the article supporting members at one or more loading stations arranged along the path of the conveyor, discharge of articles transported by the conveyor at one or more discharge stations arranged along the path of the conveyor and optionally also controlling the shifting between an aligned and a non-aligned state of adjacent article supporting member. The control means may comprise detection means for detecting the presence, the location and/or the size of articles that are conveyed or might be conveyed by the conveyor, it may additionally of alternatively comprise means for reading identification tags associated with the articles, such as e.g. barcode labels, character codes or other optically detectable codes, transponder tags, etc., and it may additionally or alternatively comprise means for reading identification tags associated with the individual conveyor unit and/or article supporting member.

The article supporting member of each conveyor unit may preferably be pivotally connected to the frame part of the conveyor unit about an aligning axis being substantially vertical. When a conveyor unit enters a curve, it may, thus, be possible for the frame to follow the guide track, i.e. to turn, while the article supporting member, or at least the article supporting surface, keeps moving in the tangential direction in which it was moving before the conveyor unit entered the curve. This may be utilised when the article supporting surface of the conveyor unit in question is aligned with the article supporting surface of an adjacent conveyor unit. Since the two conveyor units are positioned one behind the other, one of the conveyor units will enter a curve along the guide track before the other one does. If the article supporting surfaces are not aligned, this will result in mutual pivotally movements in a substantially horizontal plane of the article supporting surfaces of the two conveyor units. If, however, the article supporting surfaces are aligned, a substantially common article supporting surface may be maintained, even when the conveyor units enter a curve along the guide track, and even if the radius of curvature of the curve is so small that a conveyor unit having an article supporting surface having an area corresponding to the area of the common article supporting surface, is not allowed to enter the curve.

Thus, a conveyor which is capable of carrying articles of different sizes with efficient utilisation of the article supporting area of the conveyor is provided, the conveyor being less area consuming than conventional conveyors, since the curves of the conveyor may have a smaller radius of curvature than conventional conveyors being capable of carrying large articles.

Preferably, the stationary guide track forms a closed loop, so that the individual conveyor units may complete a loop routine including receiving an article at a loading station, carrying the article to a certain discharge station, discharging the article at the discharge station and returning to the loading station without having to reverse the direction of motion.

Most preferably, the plurality of conveyor units form a closed chain of conveyor units. Thus, there is preferably a closed chain of conveyor units fully covering a closed loop formed by the stationary guide track.

At least one of the at least one discharge stations may have means associated with it for activating the discharge means of at least two consecutive conveyor units in such a way that the discharge means of the at least two consecutive conveyor units are activated with a predetermined time interval so as to enable discharge of an article being supported by more than one of the supporting members of the at least two consecutive conveyor units at the discharge station.

The activating means may be mechanical. In an embodiment in which the article supporting members comprise one or more trays, the mechanical activating means may comprise, e.g., one or more tilting tracks positioned along the stationary guide track near the discharge stations, and adapted for engaging with wheels positioned on the individual conveyor unit, the tilting track(s) and the tilting wheel(s) being positioned in such a way that a tilting wheel may be made to engage with a tilting track when desired, and in such a way that the tray is tilted when one or more tilting wheels engages with one or more tilting tracks.

Alternatively or additionally, the activating means may be electrical and/or magnetic and/or pneumatic and/or hydraulic and/or any other suitable kind of activating means.

Preferably, the supporting surfaces of the at least two consecutive conveyor units are aligned by first and second aligning means. Thus, an article being carried by the two or more consecutive conveyor units may be discharged at a certain discharge station by activating the discharge means of all the conveyor units carrying the article.

The discharge means of all the consecutive conveyor units may be activated at the same time, so as to discharge the article instantly. They may alternatively be activated with a predetermined time interval which is greater than zero in such a way that the discharge means of the conveyor unit being in front is activated before the discharge means of the lacking conveyor unit. Thus, a transverse velocity will be applied to the front end of the article as compared to the lacking end, whereby the article is turned, substantially around the middle of the article. In case the dimensions of the article are so that the article stretches in one direction, it is often desired that this direction substantially coincides with the direction of transportation. It may thus be desired that the article is turned when the direction of transportation changes, e.g. when the article is discharged.

The first aligning means may comprise a rigid aligning member and the second aligning means may be designed for engaging with the rigid aligning member of a first aligning means. The first aligning means and the second aligning means may be designed so as to allow for variations in the distance between the positions at which the first aligning means and the second aligning means of immediately adjacent conveyor units connect with the respective conveyor units, the immediately adjacent conveyor units being aligned by the first aligning means and the second aligning means.

The rigid member may be, e.g., a rod being connected to the conveyor units belonging to the first group of conveyor units and the second aligning means may comprise, e.g., a hollow part adapted for receiving the rod. It may comprise locking means, such as grooves and protrusions adapted for engaging with each other and/or fastening means such as screws, for permanently or non-permanently locking the first aligning means and the second aligning means together.

Preferably, the first aligning means and the second aligning means are designed so as to allow for variations in the distance between the positions at which the aligning means connect to the respective conveyor unit. When two consecutive conveyor units enter a curve of the guide track and the supporting surfaces of the two conveyor units are aligned, it may be necessary to alter the distance between the above mentioned positions in order to keep the supporting surfaces aligned while the frame members of the conveyor units perform mutual pivotally movements. The distance may need to be increased or decreased depending on in which direction the guide track is curved as compared to the position of the first and second of the respective conveyor units.

Alternatively or additionally the first and the second aligning means comprise an independent drive means for driving a mechanism for pivoting the article supporting member about at least one aligning axis being substantially perpendicular to the article supporting surface.

The independent drive means may be e.g., a electrical motor, a pneumatic motor or a hydraulic motor.

The mechanism for pivoting the member may comprise e.g.,

- at least two wheels e.g. pinion wheels or friction wheels, which are able to transmit an angular moment from one wheel to the other, or
- a wheels-and-rim mechanism e.g., a notched wheels and notched rim, V-belt wheels and V-belt, sprocket wheels and chain, a rack and pinion drive or a non-linear rack and pinion drive.

This type of aligning mechanism is mainly used when the conveyor unit has an onboard power supply which generally is the case when an electrical tilting mechanism or a crossbelt is employed, but further the conveyor could use a pneumatic or hydraulic motor if there for some reason is pressurised air or hydraulic pressure present on the conveyor unit.

In embodiments wherein each of the conveyor units belonging to at least one of the first group and the second group of conveyor units comprises a tray, the tray may be arranged tiltably about a tilt axis. The tilt axis may be substantially parallel to the direction of transportation of the conveyor, the tilt axis of a first conveyor unit belonging to the first group of conveyor units being substantially coincident with the tilt axis of an adjacent second conveyor unit belonging to the second group of conveyor units, the first conveyor unit and the second conveyor unit being aligned with each other by their respective first aligning means and second aligning means, when the first conveyor unit and the second conveyor unit are placed on a substantially straight part of a guide track.

When the conveyor units are moved on a substantially straight part of a guide track both of the aligned trays may, thus, be tilted about substantially coincident tilt axes, whereby an article being supported by both article supporting surfaces may be discharged by tilting the two trays at the same time or with a predetermined time interval. When the conveyor units enter a curve along the guide track and the respective article supporting surfaces are aligned with each other, the tilt axes will still be substantially coincident with each other, thus allowing an article being supported by both article supporting surfaces to be discharged when being conveyed during a curve of the guide track.

The first aligning means and the second aligning means may further be designed in a way that allows for pivotal movements between the positions at which the first aligning means and the second aligning means of immediately adjacent conveyor units connect with the respective conveyor units. The pivotal movements are preferably allowed about an axis that substantially coincide with the tilt axes of the conveyor units being aligned by the first and the second aligning means so as to enable individual tilting movements of the trays of the conveyor units.

It is, thus, preferably possible to tilt both of the aligned trays, only one of the trays or none of the trays when the conveyor units pass a discharge station, so that consecutive trays may be utilised for carrying large articles occupying two or more trays, or for carrying small articles occupying only one tray, thus providing a conveyor which is very flexible, the capacity of which is exploited in an efficient way.

The first aligning means and the second aligning means may additionally be connected with the respective conveyor units in a way that allows for pivotal movements between the individual aligning means and the respective conveyor unit about an axis being substantially horizontal and substantially perpendicular to the direction of transportation of the conveyor so as to allow for conveyor units being aligned by first aligning means and second aligning means to move along guide track sections curved in projection on a vertical plane.

Thus, the aligning means may allow for pivotal movements between the individual aligning means and the respective conveyor units about two substantially perpendicular axes, thus effectively allowing for pivotal movements in any direction. This may be obtained by providing the aligning means with two pivot axes being substantially perpendicular to each other. It may alternatively be obtained by mounting the aligning means on the respective conveyor units by a sphere or part of a sphere, thus allowing the aligning means to pivot in any direction as compared to the respective conveyor unit.

The article supporting member of each conveyor unit may be pivotally connected to the frame part of the conveyor unit about an axis being substantially horizontal, substantially perpendicular to the direction of transportation of the conveyor, and substantially intersecting the vertical axis about which the article supporting member is pivotally connected to the frame part so as to enable that the article supporting member of the first conveyor unit belonging to the first group of conveyor units and the article supporting member of the second conveyor unit belonging to the second group of conveyor units, said first and second conveyor units being aligned by the first and second aligning means, may be substantially aligned so as to form a substantially common article supporting surface during all mutual pivotally movements of said first conveyor unit and said second conveyor unit.

As described above, this may be obtained by providing the article supporting member with two pivot axes being substantially perpendicular to each other, or it may alternatively be obtained by mounting the article supporting member on the frame part using a sphere.

In this embodiment it is possible to align consecutive article supporting members during all mutual pivotal movements of the conveyor units, such as when the conveyor units enter curves along the guide track which are curved in a substantially horizontal plane or in a substantially vertical plane or in any other suitable plane in which the guide track may be curved.

The first aligning means and the second aligning means may further be designed so that the article supporting member of the first conveyor unit and the article supporting member of the second conveyor unit, said first and second conveyor units being aligned by the first and second aligning means, are substantially aligned so as to form a substantially common article supporting surface during all mutual pivotally movements of said first conveyor unit and said second conveyor unit.

In one embodiment of the invention the first and the second aligning means may connect the trays of the conveyor units being aligned by the first and the second aligning means. This may be obtained, e.g., by applying one or more rods, preferably two rods, to the respective trays.

The alignments established by the first and second aligning means may be permanent Thus, a permanent physical connection may be applied when the conveyor is installed, so that the conveyor units are connected two by two, three by three or even higher numbers.

In a preferred embodiment, all of the conveyor units belong to the first group of conveyor units as well as to the second group of conveyor units. Thus, all of the conveyor units preferably comprise first aligning means as well as second aligning means, so that any conveyor unit is capable of aligning its article supporting surface with the article supporting surface of any other adjacent conveyor unit.

Most preferably, the first aligning means and the second aligning means are designed for having a first state in which alignment is established between the article supporting members of the first and the second conveyor units, and a second state in which alignment is not established, and the conveyor comprises means for switching between said first state and said second state.

Any conveyor unit may be capable of aligning with both of the conveyor units being immediately adjacent by means of the first and second aligning means when desired.

In an embodiment in which all of the conveyor units belong to the first as well as the second group of conveyor units, and in which the second aligning means are designed for having a first state in which alignment is established between the article supporting members of the first and the second conveyor units, and a second state in which alignment is not established, and the conveyor comprises means for switching between said first state and said second state, alignment between supporting members of any adjacent conveyor units may be obtained when desired. Thus, an extremely flexible conveyor is provided, in which alignment of the required number of article supporting surfaces may be provided whenever it is needed, so that articles of different sizes may be conveyed by the conveyor in any order, and so that the capacity of the conveyor is exploited in the most efficient manner possible.

Thus, a very flexible conveyor having a large capacity is provided.

In another aspect of the present invention is provided a pair of conveyor units for use in a conveyor as described above, wherein the first conveyor unit is adjacent to the second conveyor unit and each of the conveyor units comprising a frame part, an article supporting member mounted on the frame part, the article supporting member having an article supporting surface, and means for discharging articles from said article supporting member at a predetermined discharge station of the conveyor, the first conveyor unit comprising first means for aligning the first conveyor unit with the second conveyor unit, the second conveyor unit comprising second means for aligning the second conveyor unit with the first conveyor unit, said first aligning means and said second aligning means being designed so that when the first conveyor unit and the second conveyor unit are aligned with each other by their respective first aligning means and second aligning means, the article supporting member of the first conveyor unit and the article supporting member of the second conveyor unit are substantially aligned in a projection on a horizontal plane so as to form a substantially common article supporting surface during all mutual pivotally movements of said first conveyor unit and said second conveyor unit.

The article supporting surfaces of the conveyor units of the conveyor may be aligned two by two.

Three or more article surfaces may be aligned in such a way that one or more of the three or more article supporting surfaces is aligned with the article supporting surfaces of both of the adjacent conveyor units.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF FIGURES

The present invention will become more fully understood from the detailed description given hereinbelow and the accompanying drawings which are given by way of illustration only, and thus are not limitative of the present invention, and wherein.

DETAILED DESCRIPTION OF THE FIGURES.

The present invention may be carried out in a vast number of different ways, one reason is that an add-on kit according to the present invention may be designed for many existing conveyors. The embodiments illustrated in the figures are only some examples of how the present invention may be carried out with rigid connections between the adjacent conveyor units that are to be aligned. However, the invention may also be realised without rigid connections where other means are used for aligning the conveyor units.

Figure 1:
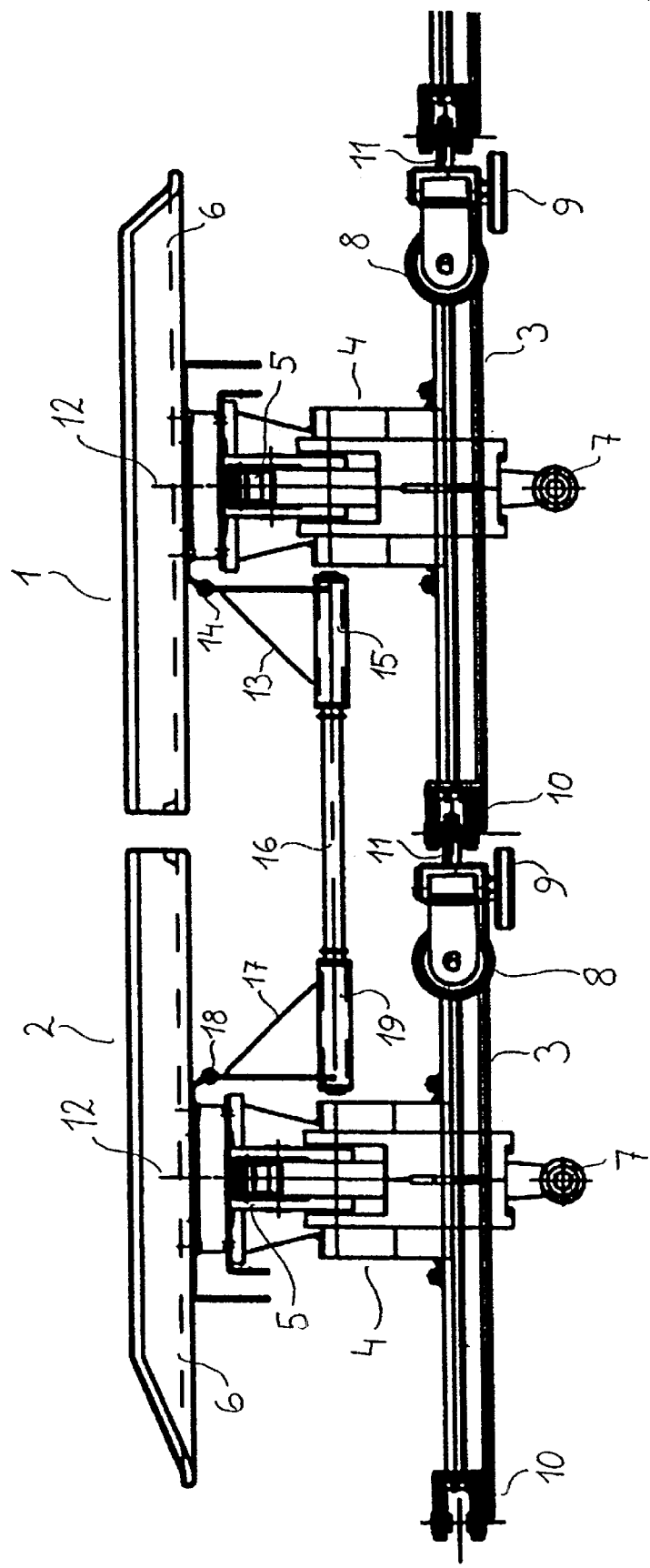
FIG. 1 shows an embodiment with a permanent, rigid alignment connection between two adjacent conveyor units se from one side.

FIG. 1 shows an embodiment of the invention in which a permanent, rigid alignment connection is arranged between a first 1 and a second 2 adjacent conveyor unit as seen from one side. Each conveyor unit 1, 2 comprises a frame part 3, a console 4 on which a tilting mechanism 5 for tilting a tray 6 is mounted. The tilting mechanism 5 has arms 7 by which the mechanism 5 is activated and tilts the tray 6 to one or the other side about a vertical axis that is parallel to the transport direction of the conveyor, so as to discharge an article placed on the tray 6. The arms 7 are lowered or raised by switching devices arranged at discharge stations, causing the mechanism to be activated, and causing the article to be discharged at the discharge station. The tray 6 is returned to its horizontal position by a second switching mechanism placed along the guide track after the discharge station. The frame part 3 is a T-shaped frame made from an extruded aluminium profile with a pair of support wheels 8 and a pair of guiding wheels 9. The frame part 3 is at each end in the transport direction equipped with coupling means 10, 11 for coupling adjacent conveyor units to each other. The coupling means 10, 11 allow for mutual pivotally movements between adjacent conveyor units in the horizontal plane as well as in the vertical plane. The tray 6 is mounted on the tilting mechanism 5 in such a way that the tray 6 is allowed to pivot relatively to the frame part 3 about a vertical axis 12 so as to enable that the connected trays 6 of adjacent conveyor units 1, 2 can be aligned when the conveyor units 1, 2 pass a section of the guide track which is curved in the horizontal plane.

The first conveyor unit 1 further comprises a first connecting part 13 that is connected to the tray 6 of the first conveyor unit 1 with a hinge 14 so that it may hinge relatively to the tray 6 about a horizontal axis that is transversal to the transport direction. The first connecting part 13 further has a bushing 15 in which a rod 16 is placed so that the first connecting part 13 may hinge relatively to the rod 16 about an axis that coincide with the axis about with the tray 6 may tilt. The rod 16, being comprised in the first means for aligning, may also move relatively to the bushing 15 in the transport direction of the conveyor, thus allowing for changes in the distance between the trays 6 of the first conveyor unit 1 and the second conveyor unit 2 when they pass a section of the guide track which is curved in the horizontal plane. The second conveyor unit 2 comprises a second connecting part 17 that is similar to the first connecting part 13. The second connecting part 17 is connected to the tray 6 of the second conveyor unit 2 with a hinge 18 and to the rod 16 with a bushing 19.

Figure 2:
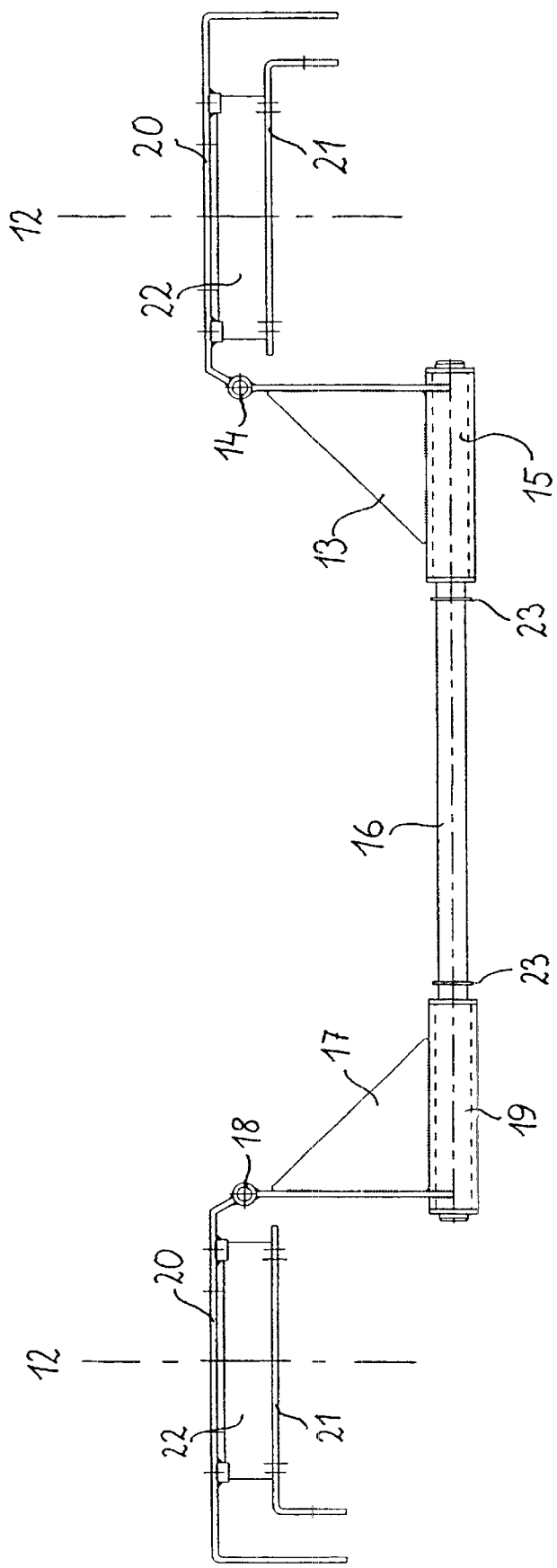
FIG. 2 shows details alignment connection of the embodiment of FIG. 1.

Details of the first and second aligning means are shown in FIG. 2. The first and second connecting means 13, 17 are connected by the hinges 14, 18 to tray mounting plates 20 on which the trays 6 are fixed. The plates 20 are connected to upper plates 21 of the tilting mechanisms 5 with hinges 22 that allows the tray mounting plates 20 to pivot relatively to the tilting mechanism 5 and the frame part 3 about a vertical axis 12. Thus, in the present embodiment, the first and second aligning means comprise the rod 16, the plates 20 and 21 and the hinge 22. The rod 16 has two stops 23 for limiting the relative movements between the rod 16 and the bushings 15, 19.

The first and the second aligning means keep the trays 6 of the first 1 and the second 2 conveyor unit substantially aligned in a projection on a horizontal plane during all pivotal movements between the first 1 and the second 2 conveyor unit, thereby forming a common article supporting surface, and allowing at the same time the two trays 6 to be tilted individually. Thus, the two trays 6 may be used for carrying two individual articles or they may be used for carrying a single article that is supported by both trays 6. Such a single article may be discharged from the trays 6 by tilting the trays 6 simultaneously, or one tray may begin tilting a predetermined time period before the other so as to turn the single article in a horizontal plane during the discharging action.

The embodiment of aligning means shown in FIGS. 1 and 2 does not prevent the trays 6 of the first 1 and second 2 conveyor unit from moving relatively to each other in a vertical plane when they pass a section of the guide track which is curved in a vertical plane and the trays 6 have a distance in between so as to allow for such a movement.

Such relative movements of the trays 6 in the vertical plane are eliminated in an alternative embodiment where the hinges 14, 18 are replaced with a rigid connection and the hinges 22 between the tray mounting plates 20 and the upper plates 21 of the tilting mechanisms 5 allow the plates 20 to pivot relatively to the tilting mechanism 5 and the frame part 3 about a vertical axis 12 and about a horizontal axis that is perpendicular to the transport direction and is intersecting the vertical axis 12. The hinge 22 according to this alternative embodiment may be formed by a part with a concave surface that fits with a part with a spherical surface.

Figure 3:
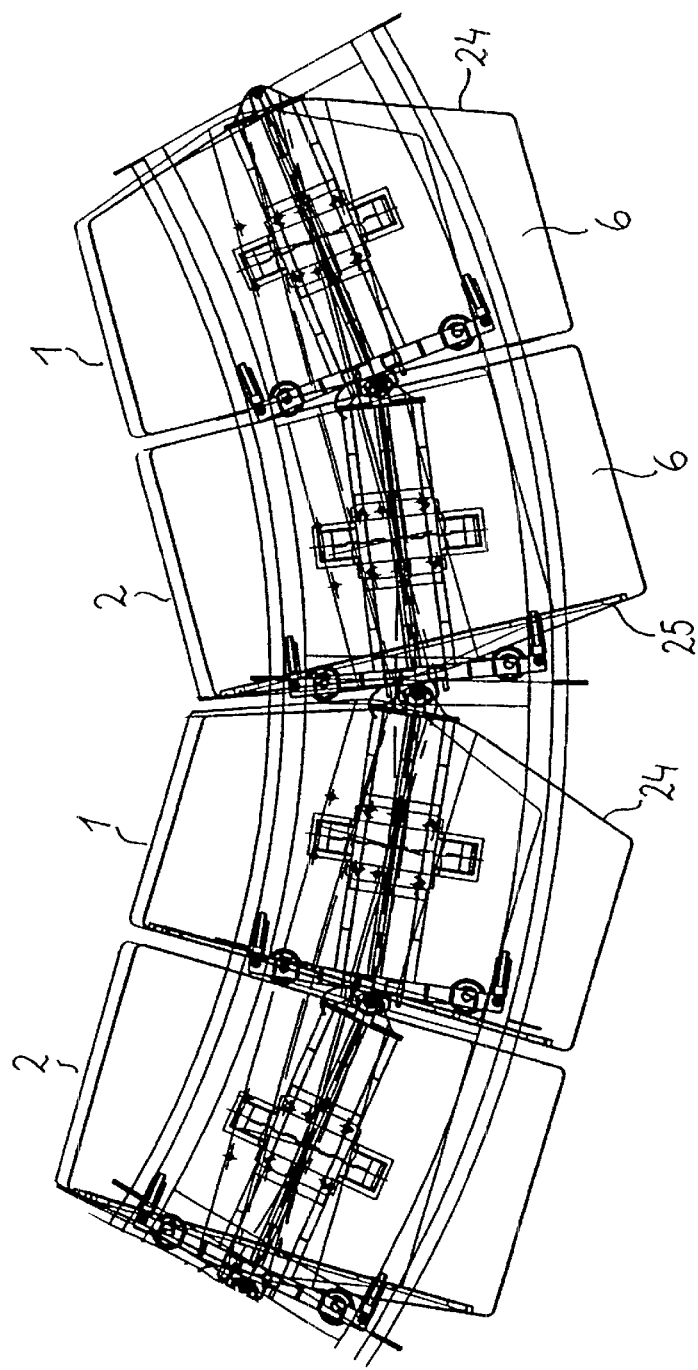
FIG. 3 shows the embodiment of FIG. 1 as seen from above, in which the conveyor units are running on a part of the track section that is curved in a horizontal plane.

FIG. 3 shows the embodiment of FIGS. 1 and 2 as seen from above, in which the conveyor units 1, 2 are running on a part of the track section that is curved in a horizontal plane. The trays 6 of the conveyor units 1, 2 that are connected by the aligning means are aligned in a horizontal plane when the conveyor units 1, 2 pass the curved track section. The leading edge 24 of the tray 6 of the first conveyor unit 1 is shaped so a to allow for the relative movement in a horizontal plane between the tray 6 of the first conveyor unit 1 and the tray 6 of the second conveyor unit 2 of the immediately preceding pair of first 1 and second 2 conveyor units.

The gap between the leading edge 24 of the tray 6 of the first conveyor unit 1 and the trailing edge 25 of the tray 6 of the second conveyor unit 2 of the immediately preceding pair of first 1 and second 2 conveyor units reduces the effective article carrying area of the conveyor and parts of the articles transported by the conveyor may get wedged between the two trays 6 during their relative movements as well as during tilting of the trays 6 and returning of the trays 6 to their article carrying position. To at least partly solve these problems, the tray 6 of the first conveyor 1 may be equipped with a second tray that is hinged to the tray 6 about a vertical axis that coincides with the vertical axis about which the frame part 3 of the first conveyor unit 1 may pivot relatively to the frame part 3 of the second conveyor unit 2 of the immediately preceding pair of first 1 and second 2 conveyor units. The second tray should be of a size and shape so that it substantially covers the gap and should be arranged so that it is affected by the tray 6 of the preceding second conveyor unit 2 to follow the relative movements between the trays and at the same time be able to follow a tilting movement of the tray 6 with which it is connected. This may be achieved by placing a vertical plate on the trailing edge 25 of the tray 6 of the second conveyor unit 2 extending in most of the width of the tray 6 and extending below and above to 20 the plane of the tray 6, and by equipping the leading edge of the second tray with a resilient upwardly swept part that is pressed into contact with the vertical plate of the tray 6 preceding the second conveyor unit 2.

Figure 4:
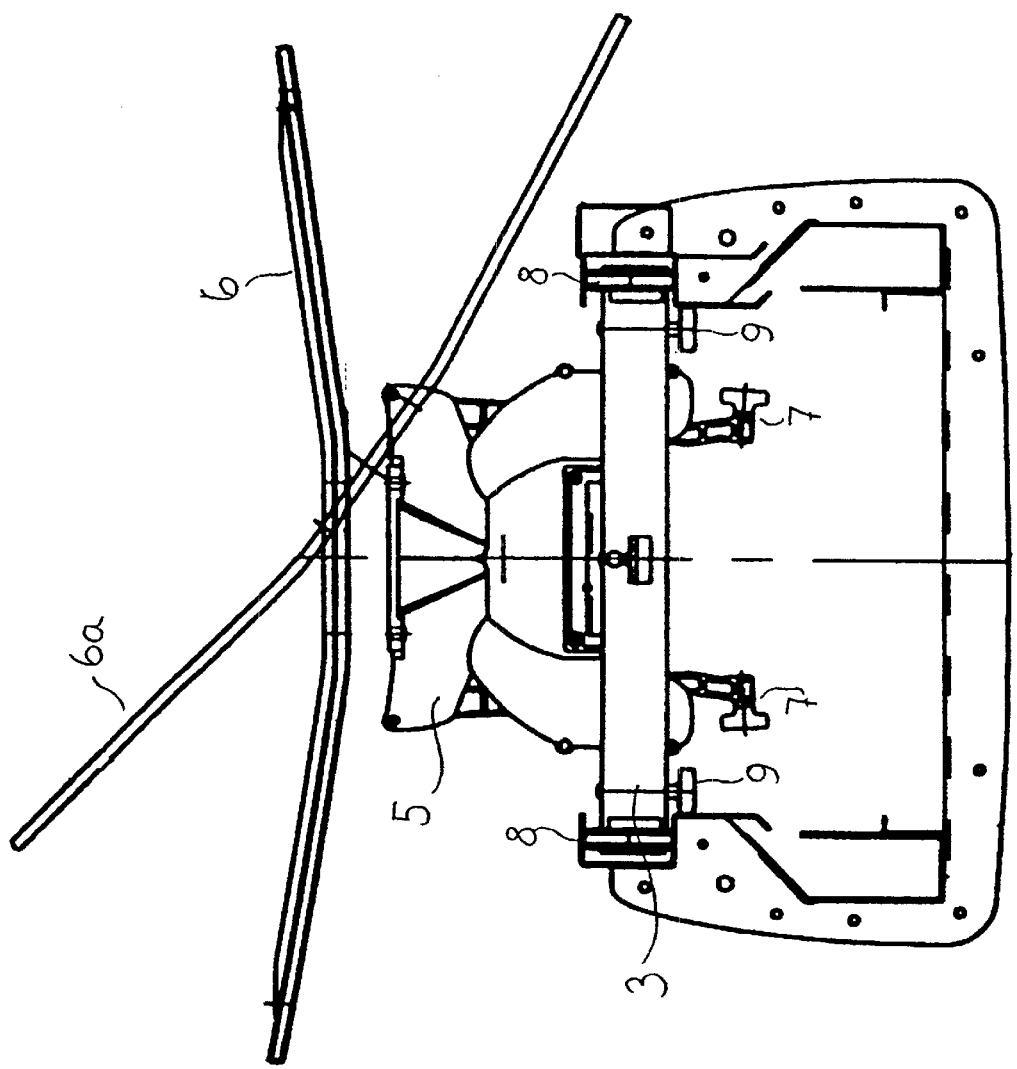
FIG. 4 shows a cross-sectional view of a conveyor unit.

FIG. 4 is a cross-sectional view of a conveyor unit showing the tray 6 in the article carrying position 6 and in a tilted position 6a. The support wheels 8 and the guiding wheels 9 engages with horizontal and vertical surfaces, respectively, of the guide track section.

Figure 5:
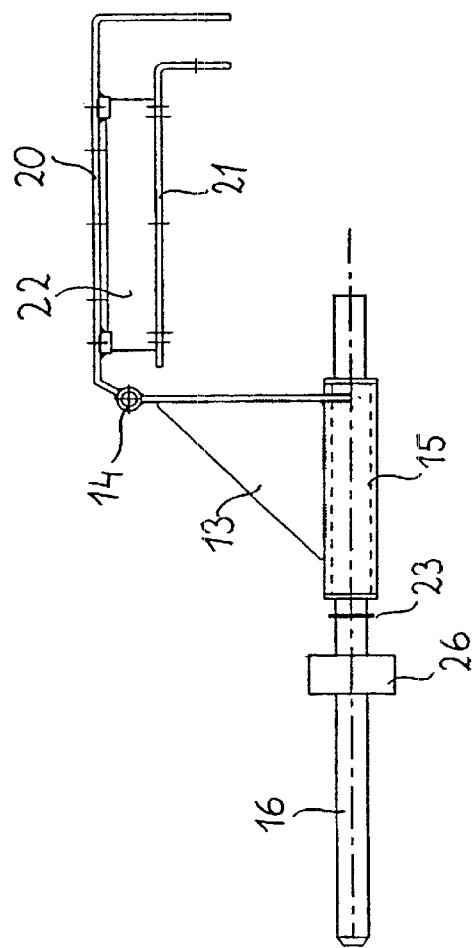
FIG. 5 shows details of a rigid alignment connection that may be shifted between an aligning state and a non-aligning state.
Figure 5:
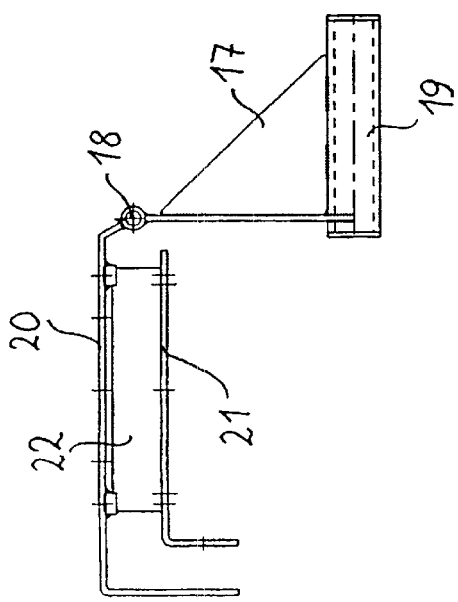

FIG. 5 shows details of a rigid alignment connection somewhat similar to the one shown in FIG. 2, but with the extra feature that the connection may be shifted between an aligning state and a non-aligning state, thus enabling an even further flexibility of the conveyor system. The rod 16 is shorter than in the previously shown embodiment so that it may slide in a direction parallel to the transport direction, so as to engage and disengage with the bushing 19 of the second connecting part 17. The rod 16 is equipped with a disc-shaped member 26 that may be engaged by stationary shifting devices arranged at one or more positions along the guide track, so that the state of the aligning means may be shifted when the conveyor units 1, 2 on which the aligning means are mounted pass the shifting devices. The member 26 is made from hard rubber or a similar material, so as to decrease the noise from the shifting operation. The trays 6 are equipped with springs that bias the direction of the trays 6 toward an aligned position so that the rod 16 of the first conveyor unit 1 is aligned with the bushing 19 of the second conveyor unit 2 and the shifting operation for engaging the rod 16 with the bushing 19 can be performed smoothly. The rod 16 is equipped with a stop 23 for limiting the movement of the rod towards the bushing 15 of the first conveyor unit 1 and is further equipped with two locking devices, each comprising a small steel ball located inside the rod 16 and resiliently biased towards a hole in the cylindrical surface of the rod 16 so that a part of the steel ball protrudes from the cylindrical surface. The bushings 15, 19 comprise recesses that fit with the locking devices, and the locking devices and the recesses are arranged so that the rod 16 may be locked in the engaging and the non-engaging position so as prevent the rod 16 from being moved out of these positions by vibrations etc. of the conveyor.

The aligning means shown in FIG. 5 may be mounted on a number of consecutive conveyor units or on all conveyor units in a closed chain of conveyor units, so that all conveyor units may be a first and/or a second conveyor unit, depending on the state of the aligning means. The conveyor may in this way achieve a higher degree of flexibility than with the conveyor units arranged as pairs of conveyor units that are aligned. A loading station may load a large article onto any two empty adjacent conveyor units instead of awaiting two empty conveyor units belonging to the same pair, thus enabling a higher coefficient of utilisation of the article carrying members of the conveyor. Also, more than two units may be aligned with each other, thus providing an even higher degree of flexibility with respect to the sizes of articles to be transported by the conveyor.

The aligning means shown in FIGS. 2 and 5 may also be used with a cross-belt sorter with minor modifications. The shifting of the position of the rod 16 of the aligning means shown in FIG. 5 may be controlled by electrically driven means, such as a solenoid or a step motor, instead of by mechanical means but it requires that a power source is present on the first conveyor unit 1. This is normally the case for cross-belt sorters, in which the individual conveyor unit has a power source, such as a battery, a generator, an inductive energy transfer arrangement or a conductor rail, for driving the cross-belt, and such a power source may be used for controlling the state of the aligning means.

The alternative embodiments and functions described for the embodiment of aligning means as shown on FIG. 2 may also be applied to the embodiment of FIG. 5.

Figure 6:
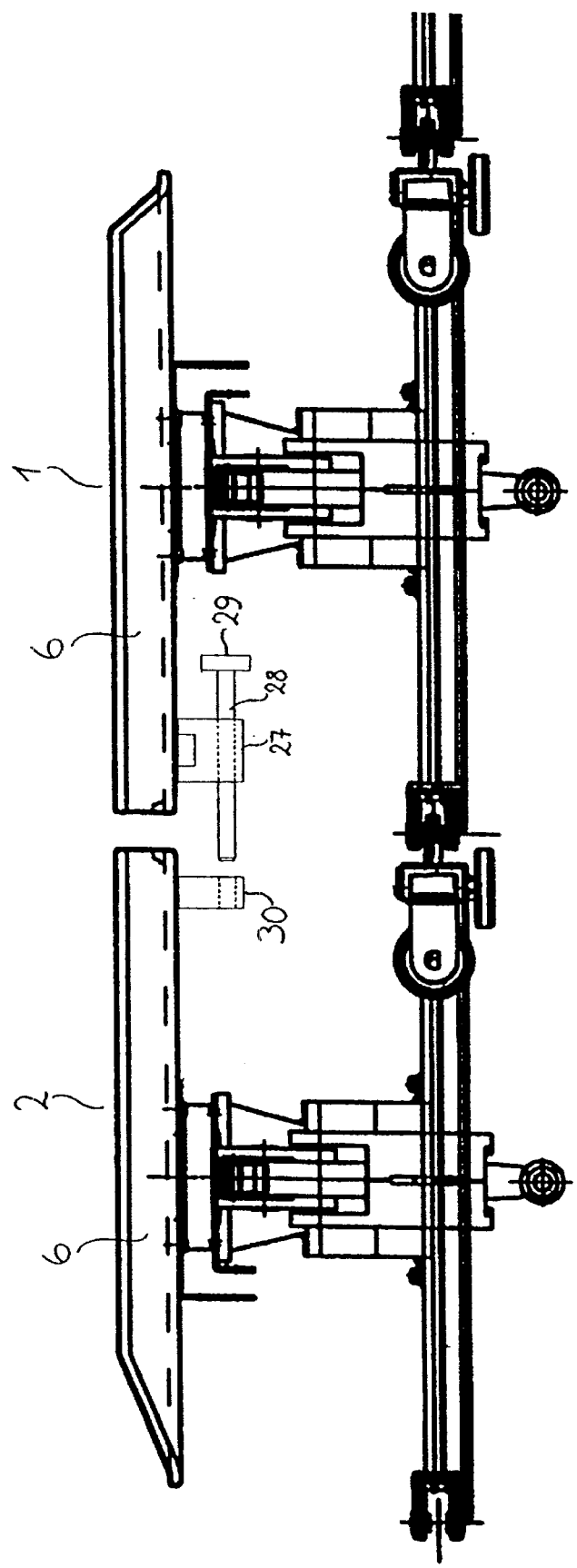
FIG. 6 shows an embodiment with a non-permanent alignment connection as seen from one side, in which the trays of two adjacent conveyor units are connected to each other.
Figure 7:
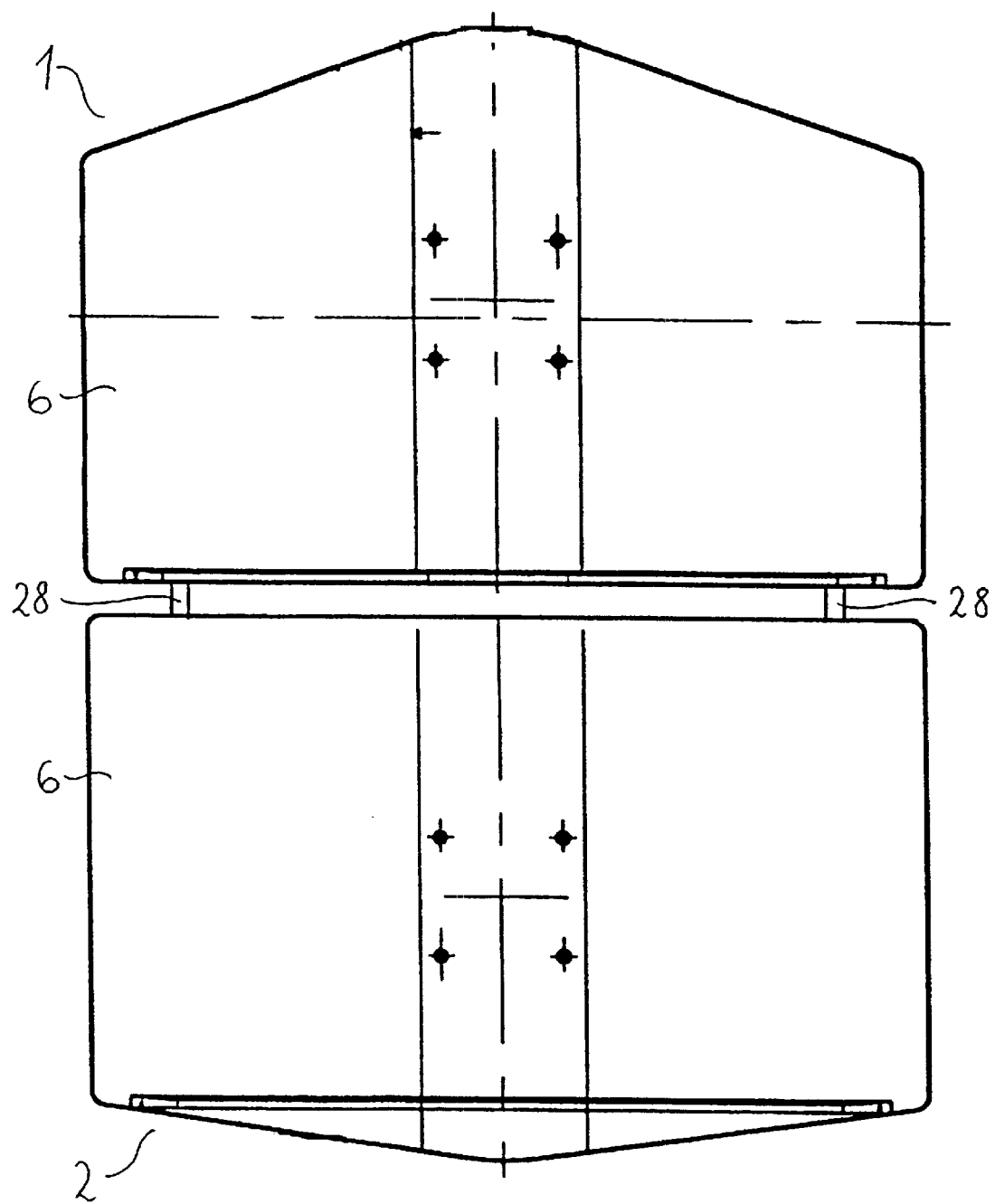
FIG. 7 shows the embodiment of FIG. 6 as viewed from above.

Another embodiment of a non-permanent alignment connection in which the trays of two adjacent conveyor units are connected to each other is shown on FIG. 6 as seen from one side and on FIG. 7 as viewed from above. The conveyor units 1, 2 are similar to the ones shown on FIG. 1. The aligning means comprise two sets of aligning devices 27–30 placed on the lower side of the trays 6 one at each side of the trays 6. Each aligning device comprises first aligning means having a guiding member 27 mounted on the tray 6 of the first conveyor unit and a rod 28 passing through a bushing of the guiding member, and a second aligning means 30 having a bushing for receiving the rod 28 and being mounted on the tray 6 of the second conveyor unit 2. The rod is equipped with a disc-shaped member 29 similar in form and function to the member 26 mounted on the rod 16 in the embodiment shown on FIG. 5 as well as locking means similar to the locking means of the rod 16 shown on FIG. 5. The rod 28 may be shifted between an aligning state and a non-aligning state by mechanical action from a shifting device. The aligning means, when activated, aligns the two trays 6 into one article supporting surface during all mutual pivotally movements of the two conveyor units 1, 2. Therefore, it is required for the functionality of conveyor units being aligned by these aligning means that the trays 6 are pivotally connected to the frame part 3 of the conveyor units 1, 2 about a vertical axis so as to allow for movements on guide track sections curving in a horizontal plane, and optionally also pivotally connected about a horizontal axis that is transversal to the transport direction and coinciding with the vertical axis so as to allow for movements on guide track sections curving in a vertical plane. Naturally, the shifting of the rod 28 may be controlled by electrically driven means instead of by mechanical means provided that a power source is present on the first conveyor unit 1.

Figure 8:
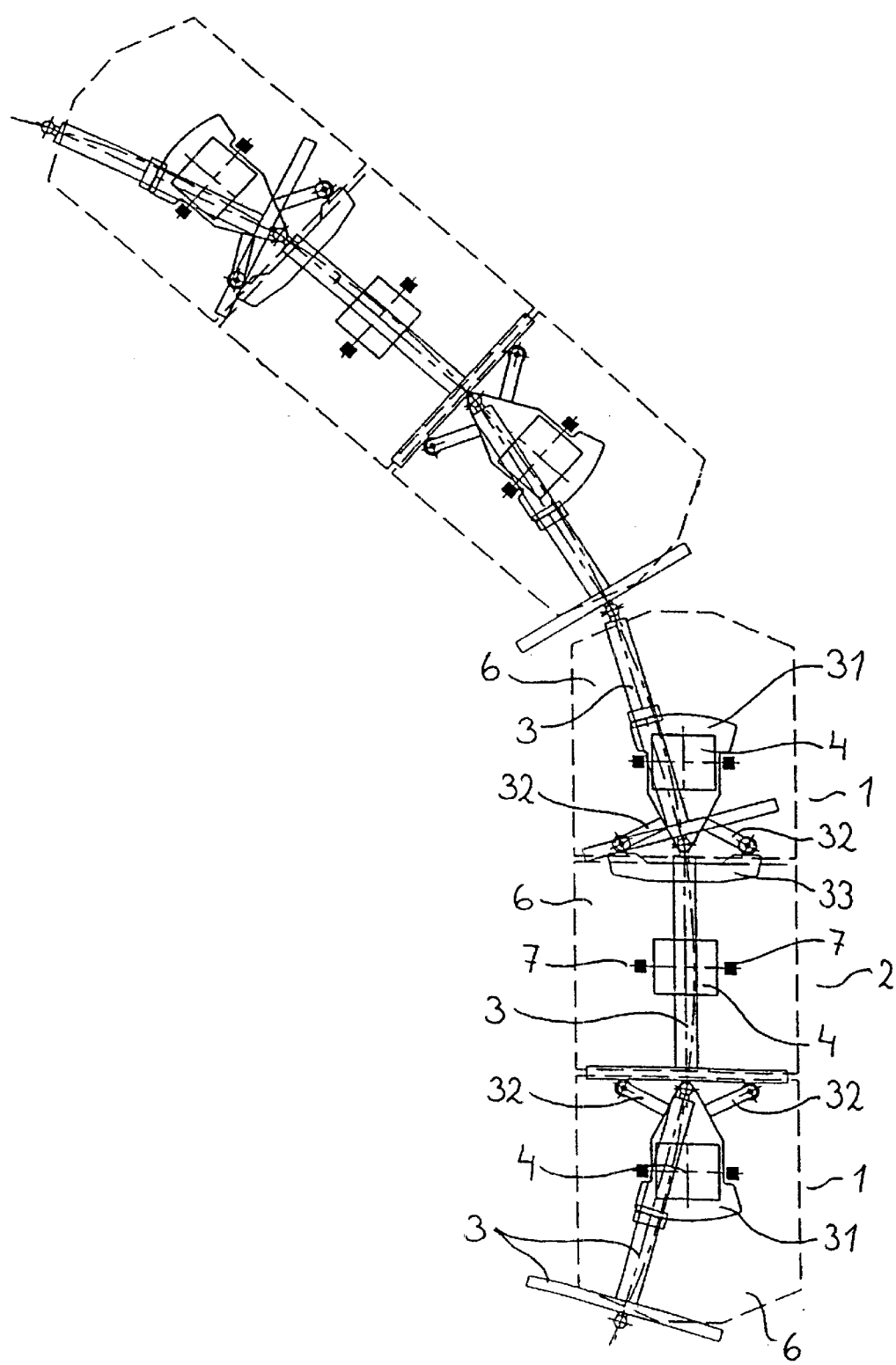
FIG. 8 shows an embodiment in which the trays of three adjacent conveyor units are aligned with each other.

Yet another embodiment of the means for aligning is shown in FIG. 8. The console 4 housing the tilting mechanism 5 of the first conveyor unit 1 is mounted on a plate 31 that is pivotally connected to the frame part 3 of the first conveyor unit 1 about an axis that coincides with the axis of the pivotally coupling between the first conveyor unit 1 and the second conveyor unit 2 with which the tray 6 of the first conveyor unit 1 is aligned. The plate 31 is equipped with two arms 32 that engage with second aligning means of the second conveyor unit 2, the second aligning means being rigidly connected to or constituting a part of the frame part 3 of the second conveyor unit 2. The arms will induce the tilting mechanism 5 and the article supporting member 6 of the first conveyor unit 1 to be aligned with the frame part 3 of the second conveyor unit. The tray 6 of the second conveyor unit 2 is permanently aligned with the frame part 3 of the second conveyor unit 2 so that the trays 6 of the first 1 and the second 2 conveyor units will be aligned in projection on a horizontal plane during all mutual pivotally movements of the two conveyor units 1, 2. The trays 6 of the first 1 and the second 2 conveyor unit are independently tiltable so the article supporting surface defined by the trays 6 of the aligned conveyor units 1, 2 may be used for large articles that need to be supported by more that one tray 6 or for small articles, that may be supported by only one tray 6.

A set of three conveyor units 1, 2 consisting of two first conveyor units 1 and one second conveyor unit 2 placed between the two first conveyor units 1 is shown in FIG. 8. The trays 6 of all three conveyor units 1, 2 are aligned so as to define a large common article supporting surface. The frame parts 3 of the conveyor units 1, 2 are T-shaped, and the transversal part of the frame part 3 of the second conveyor unit 2 constitutes the second aligning means associated with one of the first conveyor units 1, and an aligning member 33 is mounted at the opposite end of the frame part 3 of the second conveyor unit 2, so as to constitute the second aligning means associated with the other of the first conveyor units 1.

Figure 9:
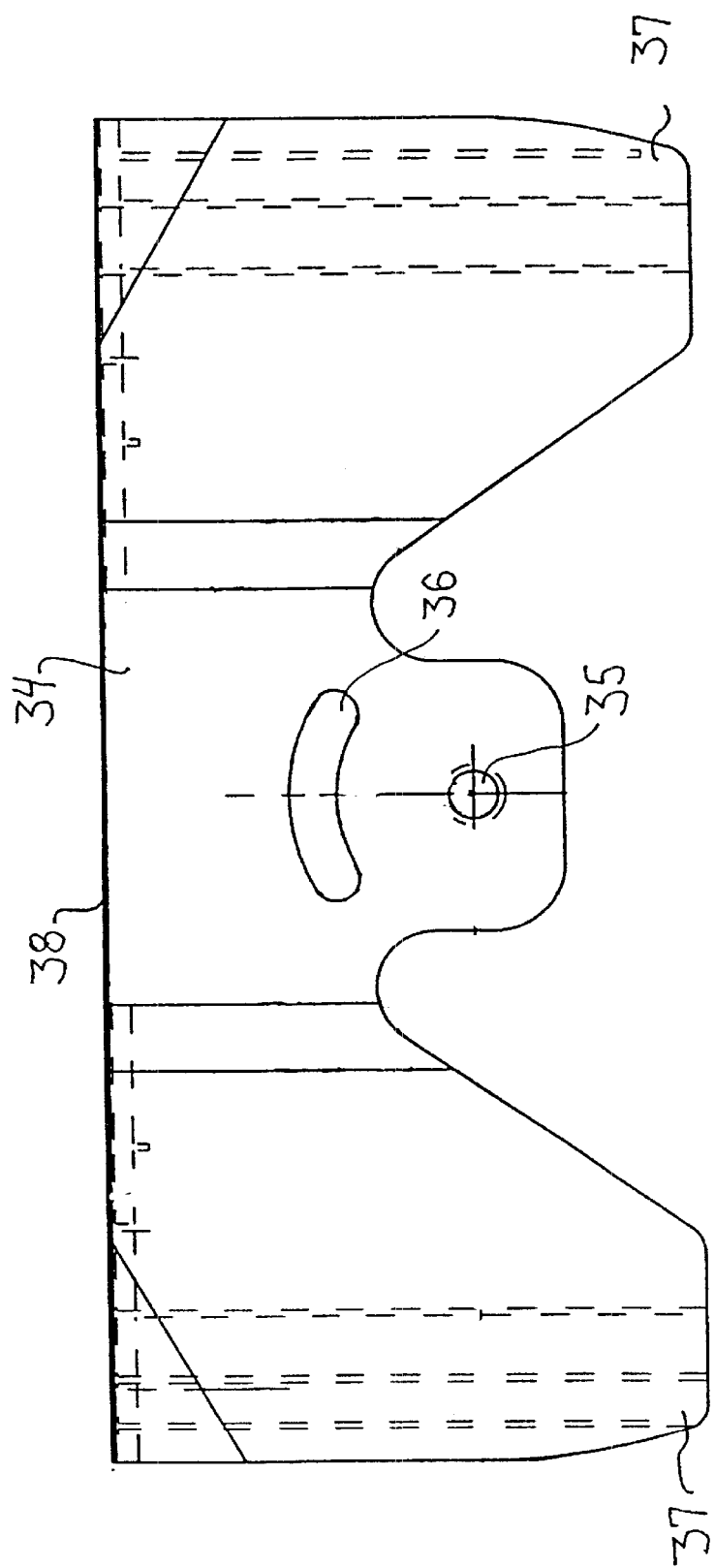
FIG. 9 is a top view of a covering member for being mounted pivotally on an article supporting member so as to cover a possible gap between the article supporting members of immediately adjacent conveyor units.

Embodiments of covering means for covering possible gaps between article supporting members of immediately adjacent conveyor units are demonstrated in FIGS. 9–15. A top view of a covering member 34 for being mounted pivotally on the lower side of an article supporting member 6 so as to cover a possible gap between the article supporting members 6 of immediately adjacent conveyor units 1, 2 is shown in FIG. 9. The covering member 34 is connected to the article supporting member 6 with a pivot pin extending through an opening 35 in the covering member 34 and being substantially perpendicular to the article supporting surface of the member 6. Another pin extends from the article supporting member 6 through an arc shaped slot 36 in the covering member 34 so as to guide the covering member 34 in its pivotal movement.

The sides 37 of the covering member 34 extend under the article supporting member 6 to a degree that ensure that no gaps form between the article supporting member 6 and the covering member 34 during pivotally movements of the covering member 34 during operation of the conveyor.

The edge 38 of the covering member 34 extending towards an immediately adjacent conveyor unit 1 is engaging with said adjacent conveyor unit 1, such as with the article supporting member 6 or with a covering member of the adjacent conveyor unit 1, through which engagement the pivotally movement of the covering member 34 is controlled so as to cover the gap during all mutual pivotal movement of the two adjacent conveyor units.

Figure 10:
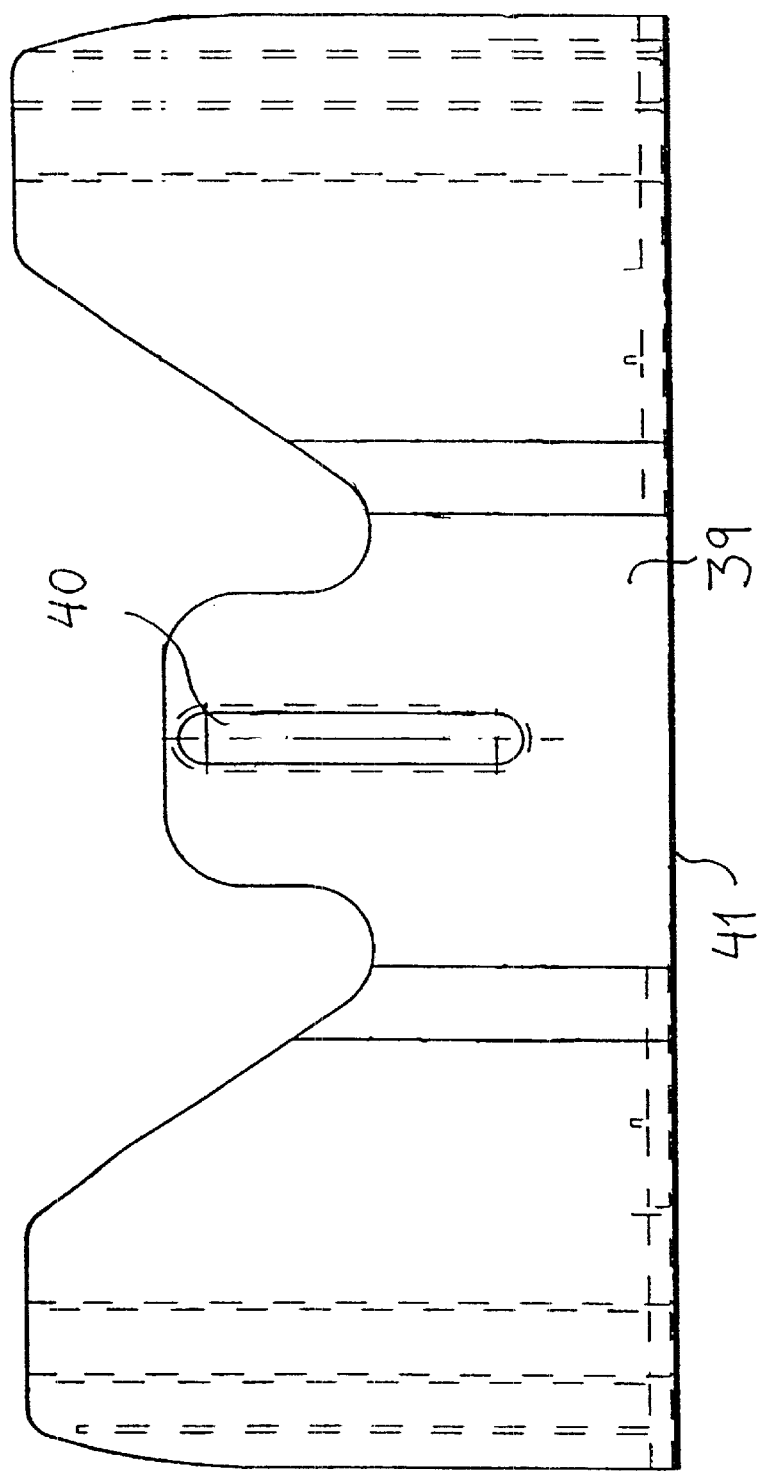
FIG. 10 is a top view of a covering member for being mounted slidably on an article supporting member so as to cover a possible gap between the article supporting members of immediately adjacent conveyor units.
Figure 11:
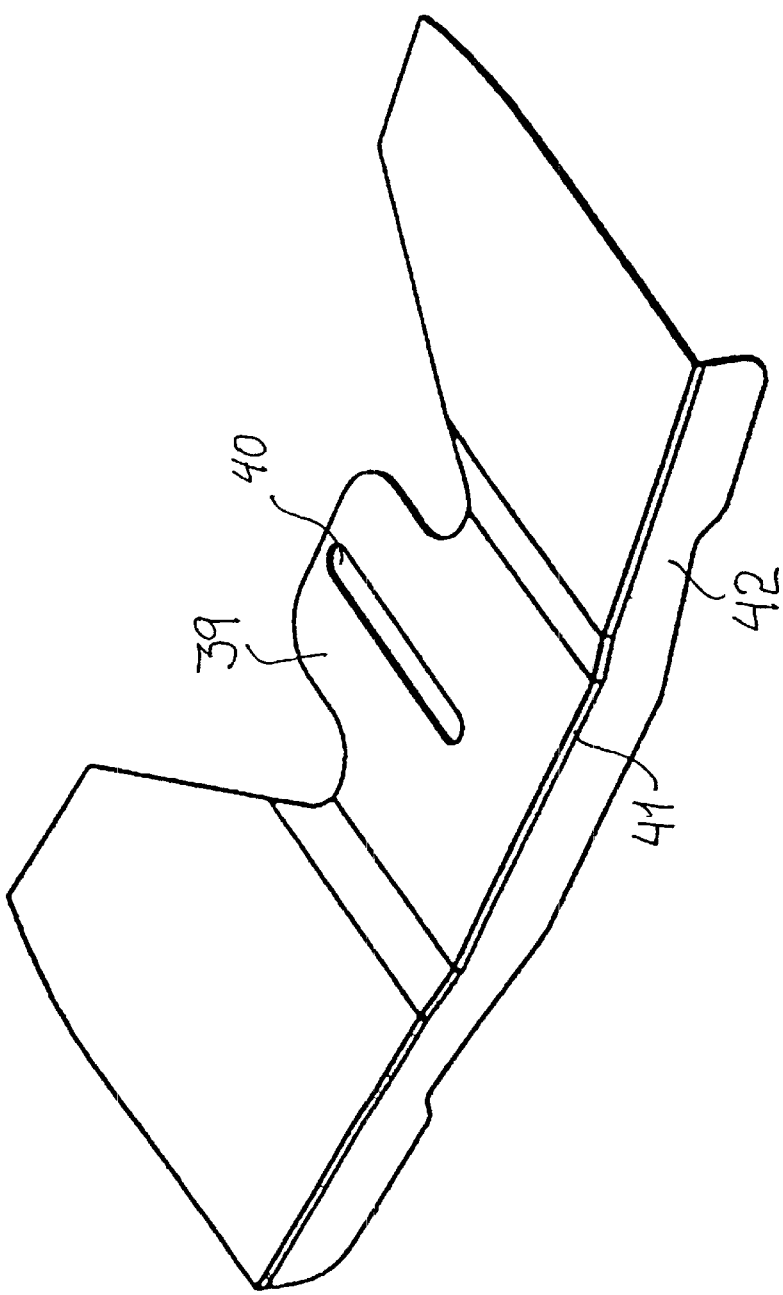
FIG. 11 is a perspective view of covering member of FIG. 10.

A covering member 39 for being mounted slidably on the lower side of an article supporting member 6 so as to cover a possible gap between the article supporting members 6 of immediately adjacent conveyor units 1 is shown in FIG. 10 in a top view and in FIG. 11 in a perspective view. Two pins with a mutual spacing extend from the article supporting member 6 through a straight elongated slot 40 in the covering member 39 so as to guide the covering member 39 in its sliding movement in the direction of the elongated slot 40 which is substantially equal to the conveying direction of the conveyor.

The edge 41 of the covering member 39 extending towards an immediately adjacent conveyor unit 1 is engaging with said adjacent conveyor unit 1, such as with the article supporting member 6 or with a covering member of the adjacent conveyor unit 1, through which engagement the slidably movement of the covering member 39 is controlled so as to cover the gap during all mutual pivotal movement of the two adjacent conveyor units. The edge 41 is provided with a screen 42 extending downwards from the covering member 39

Figure 12:
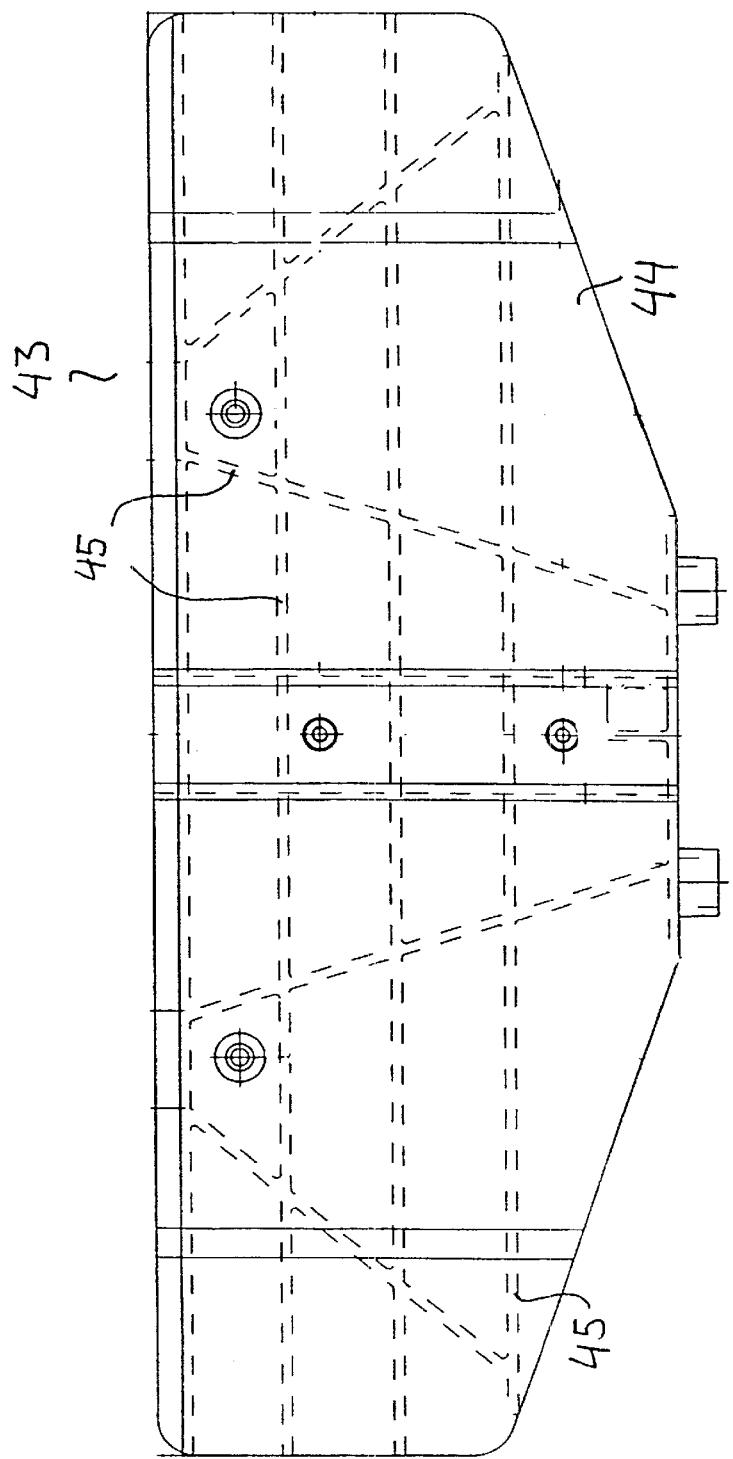
FIG. 12 is a support element for supporting the covering members of FIGS. 10 and 11, FIGS. 13 and 14 are perspective views of an aligned pair of conveyor units having a covering member of FIG. 10 mounted on each article supporting member, the covering members extending toward each other and engage mutually.

A support element 43 for supporting the covering members 34, 39 of FIGS. 10 and 11 is shown in FIG. 12 as seen from the top. The support element 43 is mounted on the lower side of the article supporting member 6 so that the covering member 34, 39 to be supported passes between a lower surface of the article supporting member 6 and an upper surface 44 of the support element 43. The surfaces that are in contact may be covered with a friction reducing material so as to prevent wear, noise and losses of power for moving the covering members 34, 39. The lower side of the support element 43 is reinforced with ribs 45 (shown with broken lines) so as to provide the necessary stiffness of the support element so that is may support the covering elements 34, 39 properly.

Figure 13:
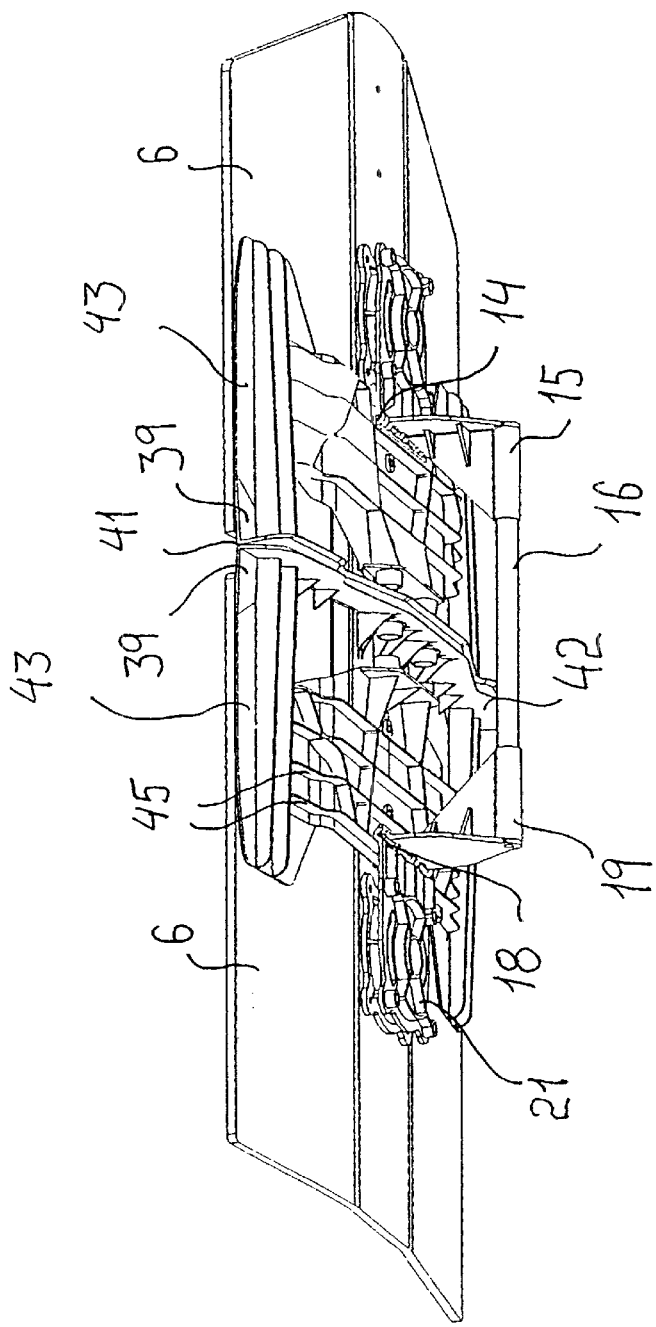
Figure 14:
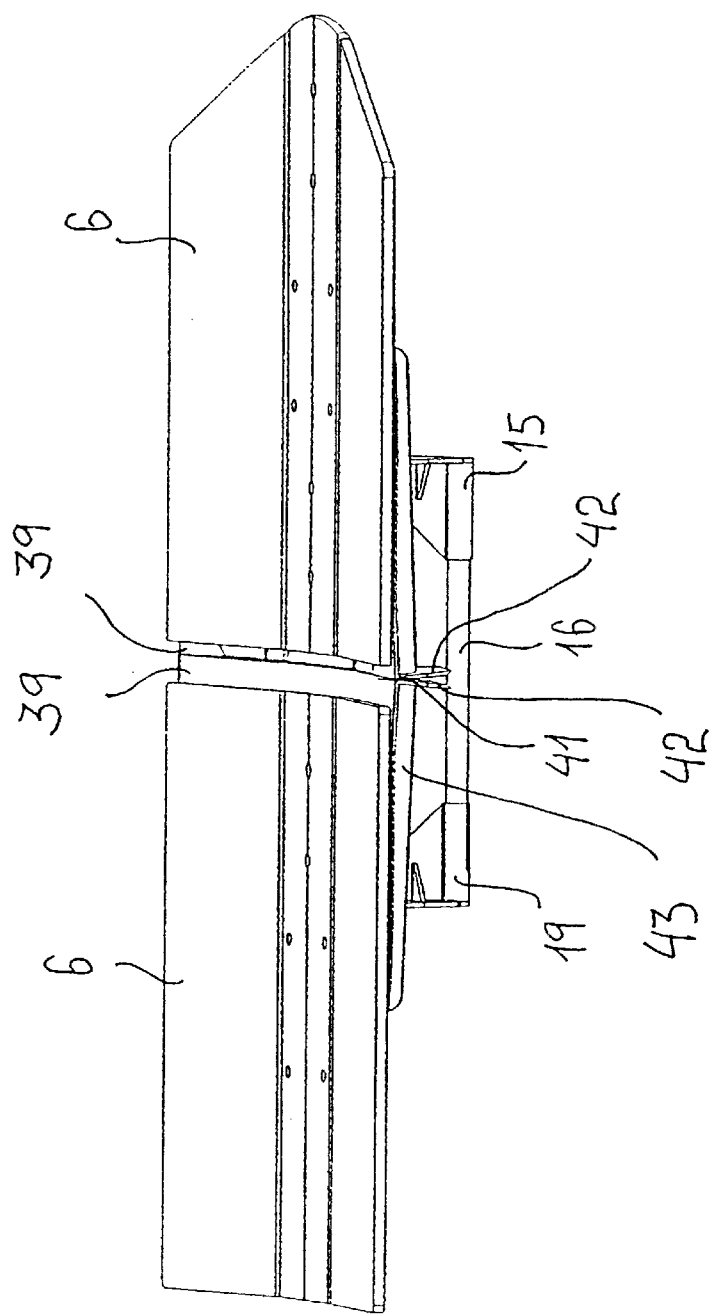

FIGS. 13 and 14 are perspective views of an aligned pair of conveyor units 1, 2 having a covering member 39 mounted on each article supporting member 6 by means of support elements 43. The covering members 39 extend toward each other and engage mutually at their edges 41. The pair of conveyor units 1, 2 are permanently aligned by means of the alignment connection shown in FIGS. 1 and 2. The slidable covering members 39 will slide back and forth and cover the gap between the two article supporting members 6 when these move toward and away from each other, e.g. when the pair of conveyor units 1, 2 moves into and from parts of the track that curve in a vertical or in a horizontal plane.

Figure 15:
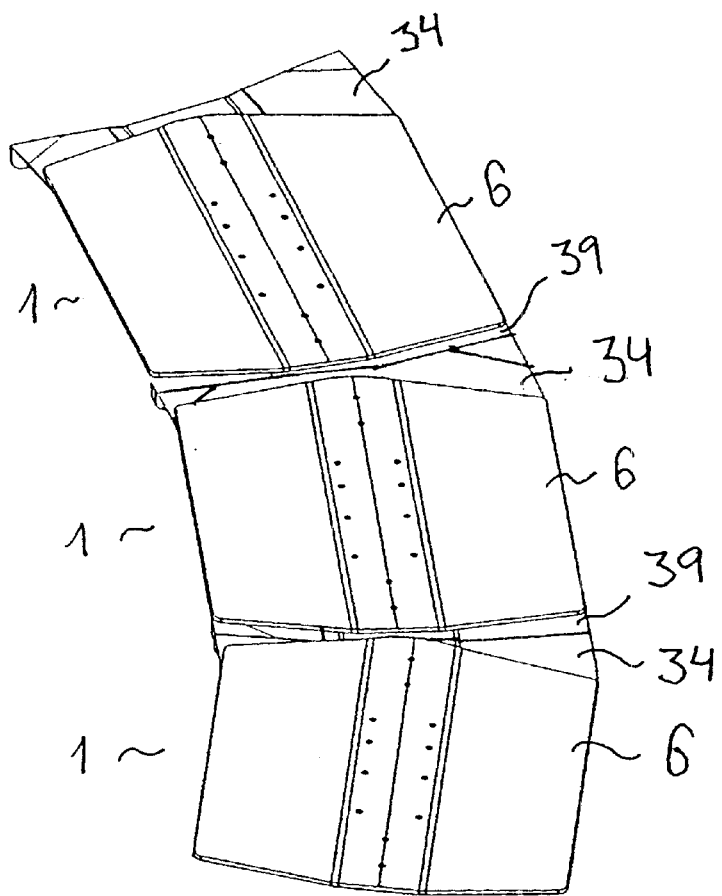
FIG. 15 is a perspective view of adjacent conveyor units having a covering member of FIG. 9 and a covering member of FIG. 10 mounted on each article supporting member.

FIG. 15 is a perspective view of adjacent conveyor units 1 each having a pivotally mounted covering member 34 arranged at one end of the article supporting member 6 in the conveying direction and a slidably mounted covering member 39 arranged at the other end of the article supporting member 6. The covering members 34, 39 of adjacent conveyor units 1 engage mutually and cover by combining the pivotal movement and the sliding movement of the respective covering members 34, 39 the gap between the article supporting members 6 at all mutually pivotal movements of the adjacent conveyor units 1 in a vertical plane as well as in a horizontal plane, whether or not two or more of the adjacent conveyor units are aligned.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conveyor for transporting articles, the conveyor comprising a stationary guide track having curved track sections, at least one loading station for loading articles onto article supporting surfaces of the conveyor, at least one discharge station for receiving articles from article supporting surfaces of the conveyor, and a plurality of interconnected conveyor units which are mutually pivotally coupled, each conveyor unit comprising a frame part, an article supporting member mounted on and supported vertically by the frame part, the article supporting member having an article supporting surface, and means for discharging articles from said article supporting member at a predetermined discharge station, at least one of the plurality of conveyor units belonging to a first group of conveyor units, each of the conveyor units belonging to the first group of conveyor units comprising first means for aligning the conveyor unit with another immediately adjacent conveyor unit belonging to a second group of conveyor units, each of the conveyor units belonging to the second group of conveyor units comprising second means for aligning the conveyor unit with another immediately adjacent conveyor unit belonging to the first group of conveyor units, said first aligning means and said second aligning means being designed so that when a first conveyor unit belonging to the first group of conveyor units and an adjacent second conveyor unit belonging to the second group of conveyor units are aligned with each other by means of their respective first aligning means and second aligning means, the article supporting member of the first conveyor unit and the article supporting member of the second conveyor unit are substantially aligned in a projection on a horizontal plane so as to form a substantially common article supporting surface during all mutual pivotally movements in a horizontal plane of said first conveyor unit and said second conveyor unit.

2. A conveyor according to claim 1, wherein the article supporting member of each conveyor unit is pivotally connected to the frame part of the conveyor unit about an axis being substantially vertical.

3. A conveyor according to claim 1, wherein each supporting member comprises an endless belt arranged so that an upper surface of the belt forming the article supporting surface is movable in a direction substantially perpendicular to the transport direction of the conveyor.

4. A conveyor according to claim 1, wherein each supporting member comprises a tray which is tiltably mounted on the frame part.

5. A conveyor according to claim 1, wherein the stationary guide track forms a closed loop.

6. A conveyor according to claim 5, wherein the plurality of conveyor units form a closed chain of conveyor units.

7. A conveyor according to claim 1, wherein at least one of the at least one discharge stations has means associated with it for activating the discharge means of at least two consecutive conveyor units in such a way that the discharge means of the at least two consecutive conveyor units are activated with a predetermined time interval so as to enable discharge of an article being supported by more than one of the supporting members of the at least two consecutive conveyor units at the discharge station.

8. A conveyor according to claim 1, wherein the first aligning means comprises a rigid aligning member and the second aligning means is designed for engaging with the rigid aligning member of a first aligning means, the first aligning means and the second aligning means being designed so as to allow for variations in the distance between the positions at which the first aligning means and the second aligning means of immediately adjacent conveyor units connect with the respective conveyor units, the immediately adjacent conveyor units being aligned by the first aligning means and the second aligning means.

9. A conveyor according to claim 4, wherein the tray of each of the conveyor units belonging to at least one of the first group and the second group of conveyor units is arranged tiltably about a tilt axis being substantially parallel to the direction of transportation of the conveyor, the tilt axis of a first conveyor unit belonging to the first group of conveyor units being substantially coincident with the tilt axis of an adjacent second conveyor unit belonging to the second group of conveyor units, the first conveyor unit and the second conveyor unit being aligned with each other by their respective first aligning means and second aligning means, when said first conveyor unit and said second conveyor unit are placed on a substantially straight part of a guide track.

10. A conveyor according to claim 9, wherein the first aligning means and the second aligning means are designed in a way that allows for pivotal movements between the positions at which the first aligning means and the second aligning means of immediately adjacent conveyor units connect with the respective conveyor units, said pivotal movements being about an axis that substantially coincide with the tilt axes of the conveyor units being aligned by the first and the second aligning means so as to enable individual tilting movements of the trays of the conveyor units.

11. A conveyor according to claim 1, wherein the first aligning means and the second aligning means are connected with the respective conveyor units in a way that allows for pivotal movements between the individual aligning means and the respective conveyor unit about an axis being substantially horizontal and substantially perpendicular to the direction of transportation of the conveyor so as to allow for conveyor units being aligned by first aligning means and second aligning means to move along guide track sections curved in projection on a vertical plane.

12. A conveyor according to claim 9, wherein the first and the second aligning means connect the trays of the conveyor units being aligned by the first and the second aligning means.

13. A conveyor according to claim 1, wherein the alignments established by the first and second aligning means are permanent.

14. A conveyor comprising a first and a second conveyor unit, a stationary guide track having curved track sections, at least one loading station for loading articles onto article supporting surfaces of the conveyor, and at least one discharge station for receiving articles from article supporting surfaces of the conveyor, each of the conveyor units comprising a frame part, an article supporting member mounted on the frame part, the article supporting member having an article supporting surface, and means for discharging articles from said article supporting member at a predetermined discharge station of the conveyor, the first conveyor unit being adjacent to the second conveyor unit and comprising first means for aligning the first conveyor unit with the second conveyor unit, the second conveyor unit comprising second means for aligning the second conveyor unit with the first conveyor unit, said first aligning means and said second aligning means being designed so that when the first conveyor unit and the second conveyor unit are aligned with each other by their respective first aligning means and second aligning means, the article supporting member of the first conveyor unit and the article supporting member of the second conveyor unit are substantially aligned in a projection on a horizontal plane so as to form a substantially common article supporting surface during all mutual pivotally movements in a horizontal plane of said first conveyor unit and said second conveyor unit.

15. A pair of conveyor units according claim 14, wherein the first aligning means comprises a rigid aligning member and the second aligning means is designed for engaging with the rigid aligning member of a first aligning means, the first aligning means and the second aligning means being designed so as to allow for variations in the distance between the positions at which the first aligning means and the second aligning means of the pair of conveyor units connect with the respective conveyor units, the pair of conveyor units being aligned by the first aligning means and the second aligning means.

* * * * *